(12) United States Patent
Koenig

(10) Patent No.: US 10,422,444 B2
(45) Date of Patent: Sep. 24, 2019

(54) DEVICE FOR FIXING PIPES AND TUBES

(71) Applicant: Walter Stauffenberg GmbH & Co. KG, Werdohl (DE)

(72) Inventor: Ulrich Stefan Koenig, Herscheid (DE)

(73) Assignee: Walter Stauffenberg GmbH & Co. KG, Werdohl (DE)

( * ) Notice: Subject to any disclaimer, the term of this patent is extended or adjusted under 35 U.S.C. 154(b) by 0 days.

(21) Appl. No.: 16/061,081

(22) PCT Filed: Dec. 13, 2016

(86) PCT No.: PCT/EP2016/080721
§ 371 (c)(1),
(2) Date: Jun. 11, 2018

(87) PCT Pub. No.: WO2017/137117
PCT Pub. Date: Aug. 17, 2017

(65) Prior Publication Data
US 2019/0003614 A1    Jan. 3, 2019

(30) Foreign Application Priority Data

Feb. 12, 2016 (EP) .................................... 16155562

(51) Int. Cl.
*F16L 3/10* (2006.01)
*F16L 3/205* (2006.01)
(Continued)

(52) U.S. Cl.
CPC .............. *F16L 3/105* (2013.01); *C23F 13/18* (2013.01); *C23F 13/22* (2013.01); *F16L 3/2053* (2013.01); *C23F 2213/32* (2013.01)

(58) Field of Classification Search
CPC .......... F16L 3/2235; F16L 3/1091; F16L 3/32
See application file for complete search history.

(56) References Cited

U.S. PATENT DOCUMENTS 2,550,001 A * 4/1951 Button ................. F16L 3/1091
248/49
3,531,071 A * 9/1970 Kubli .................... F16L 3/2235
248/68.1
(Continued)

FOREIGN PATENT DOCUMENTS

DE    10 2010 026 596 A1    1/2012
EP         0 626 533 A1   11/1994
(Continued)

OTHER PUBLICATIONS

International Search Report of PCT/EP2016/080721, dated Feb. 13, 2017.

*Primary Examiner* — Amy J. Sterling
(74) *Attorney, Agent, or Firm* — Collard & Roe, P.C.

(57) ABSTRACT

A device for fixing components, particularly pipes or tubes, includes two fixing parts with recesses, which can be connected to each other, the parts forming a bushing in the mounted state, the inner contour thereof being designed to receive a pipe or a tube, at least one sacrificial element being arranged for minimizing corrosion, particularly crevice corrosion, in the event of a respectively received component being increasingly consumed with the onset of corrosion and reduction of the service life of the fixation. At least one fixing part includes at least one recess which opens up into the inner contour of the bushing and in which at least one sacrificial element is movably arranged, the sacrificial element being pre-stressed in the direction of the bushing by a spring element.

11 Claims, 2 Drawing Sheets

Figure 1:
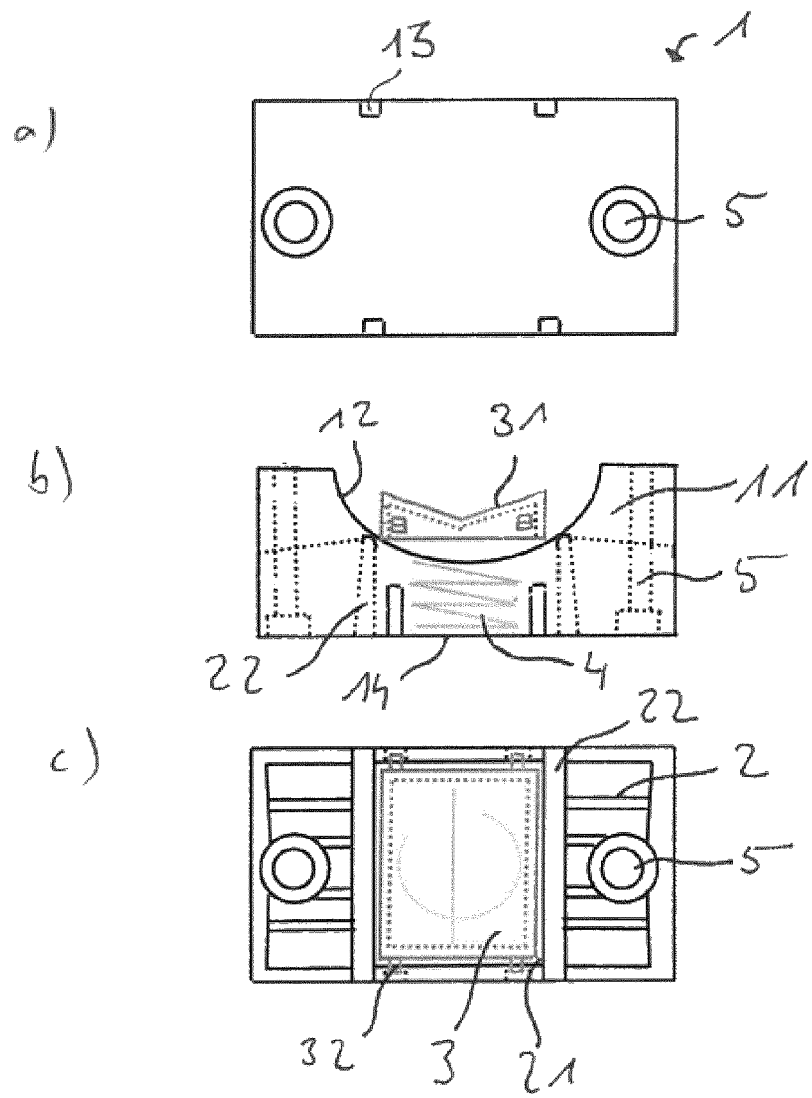

(51) Int. Cl.
 *C23F 13/18* (2006.01)
 *C23F 13/22* (2006.01)

(56) References Cited

U.S. PATENT DOCUMENTS

| | | | | |
|---|---|---|---|---|
| 3,606,218 | A * | 9/1971 | Enlund et al. | F16L 3/1091 248/74.2 |
| 3,678,634 | A * | 7/1972 | Wise | A62C 2/18 137/77 |
| 5,752,681 | A | 5/1998 | Janssen et al. | |
| 7,780,022 | B2 * | 8/2010 | Vermesi | B61G 5/08 213/76 |
| 8,550,411 | B2 | 10/2013 | Hiss et al. | |
| 9,000,299 | B2 * | 4/2015 | Ruth | H02G 3/32 174/40 CC |
| 2005/0072883 | A1 | 4/2005 | Michaud et al. | |

FOREIGN PATENT DOCUMENTS

| EP | 0 702 181 A2 | 3/1996 |
|---|---|---|
| EP | 2 913 574 A1 | 9/2015 |

\* cited by examiner

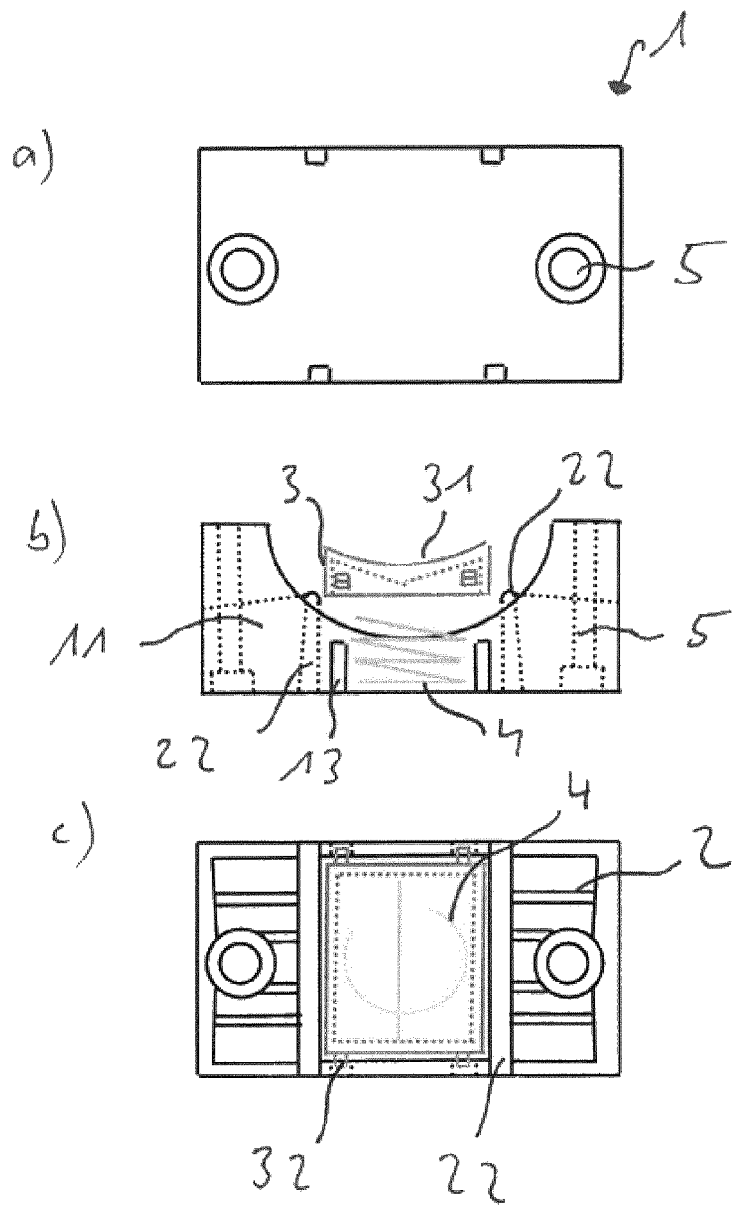

DEVICE FOR FIXING PIPES AND TUBES

CROSS REFERENCE TO RELATED APPLICATIONS

This application is the National Stage of PCT/EP2016/080721 filed on Dec. 13, 2016, which claims priority under 35 U.S.C. § 119 of European Application No. 16155562.8 filed on Feb. 12, 2016, the disclosure of which is incorporated by reference. The international application under PCT article 21(2) was not published in English.

The invention relates to an apparatus for fastening of components, in particular pipes or hoses.

So-called clamps are regularly used for fastening of pipes and hoses; they regularly comprise a clamp body that is produced from a thermoplastic or elastomer plastic or also from metal. In this regard, the clamp body is frequently formed from two fastening parts that can be connected with one another, which parts form a passage for accommodating the pipe or the hose in the assembled state. In this regard, the component to be fastened is fixed in place within the two clamp bodies essentially with force fit.

Particularly when using such clamps in corrosion-promoting environments, for example for fastening hydraulic lines in the offshore sector, corrosion of the lines to be fixed in place can occur even when using plastic clamps that are used to fix stainless steel lines in place, caused by environmental influences, such as salty air or the like. For example, crevice corrosion on metal parts is regularly found in the presence of a corrosive medium in non-sealed contact crevices, which are formed, for example, by overlapping, crosspieces that are set on, or incompletely welded connection points. In this regard, the cause of crevice corrosion is the concentration difference between the actual crevice and the environment of the corrosive medium that surrounds the crevice. As a result, a difference in potential is brought about, which leads to electrochemical corrosion within the crevice or in the region of the surroundings of the crevice. Even in the case of non-rusting chromium/nickel parts, corrosion can occur in crevices if no oxygen is present to form a protective oxide layer.

To solve this set of problems, it is proposed in DE 10 2010 026 596 A1 to provide at least one clamp part with a sacrificial element that is increasingly consumed once corrosion starts and with a progressing period of use of the clamp fastening. In this regard, the respective sacrificial element is set, as an independent component, onto the outside contour of the clamp part that can be assigned. In this way, the sacrificial element forms a half-shell, having a semicircular cross-section, for the clamp part, which shell remains uniform in terms of its wall thickness. When pipes are fastened, these are clamped in between the two clamps, and thereby the sacrificial elements are pressed against the pipe.

However, in the case of the proposed clamp, it has proven to be disadvantageous that the sacrificial element is consumed as the period of use progresses, and thereby the force-fit connection between clamp and pipeline is loosened. As a result, fastening of the pipeline is impaired, for one thing; for another, contact tears can occur between sacrificial element and pipeline, and as a result the anticorrosive effect is impaired.

This is where the invention wishes to provide a remedy. The invention is based on the task of making available an apparatus for fastening of components, in particular pipes or hoses, in which crevice corrosion is counteracted even with a progressing period of use, and the force-fit fastening of the pipes or hoses is guaranteed. According to the invention, this task is accomplished by means of the characteristics described herein.

With the invention, an apparatus for fastening of components, in particular pipes or hoses, is made available, by means of which crevice corrosion between it and the pipe or hose to be accommodated is prevented, while simultaneously guaranteeing the force-fit fastening. Because of the fact that at least one fastening part has at least one recess, which ends laterally in the passage and in which at least one sacrificial element is disposed in movable manner, which element is biased in the direction of the passage by way of a spring element, continuous force fit between the apparatus and the accommodated component is guaranteed even with increasing consumption of the sacrificial element. Furthermore, it is ensured by way of the spring element that even with increasing consumption of the sacrificial element, the latter is held against the component under constant pressure.

At this point, it is essential to the invention that the clamping force that brings about the force fit, on the one hand, and the press-down force of the sacrificial element against the accommodated component, on the other hand, are uncoupled. In this way, advancing consumption of the sacrificial element has no effect of any kind on the force-fit fixing in place of the component within the apparatus.

In the present case, the term "passage" is understood to mean the contour formed between the fastening parts, which contour lies against a fastened component, in particular a pipe or hose.

In this regard, the passage can also be formed by at least two pairs of ribs disposed on the fastening parts at a distance from one another. In the case of an apparatus for fastening of a circular pipe, the passage would be the region of an imaginary hollow cylinder that passes through the two pairs of ribs, the radius of which cylinder is defined by the contour of the contact surface of the ribs for the pipe to be accommodated.

A sacrificial element (also referred to as a sacrificial anode) is a part made from base metal, which is used for protection of functional parts composed of other metals against contact corrosion, wherein the base metal of the sacrificial element itself is destroyed, in other words sacrificed.

In the present case, the term "recess" includes any space suitable for accommodating a sacrificial element, disposed between contact surfaces of the fastening parts that transfer the clamping force onto the component to be fastened. A "recess" can also be formed, for example, by means of the space between two ribs of a fastening part that are disposed at a distance from one another.

In a further development of the invention, the spring element comprises a rubber element or elastomer element. As a result, a cost-advantageous and simultaneously reliable bias force acting on the sacrificial element can be achieved. Alternatively or in addition, the spring element can also comprise a helical spring or flexible spring.

In an embodiment of the invention, the passage is formed by contours of two or more pairs of ribs of the fastening parts, which serve to accommodate the component. In this way, material-reduced production is made possible.

In a further embodiment of the invention, at least one recess accommodating a sacrificial element is formed between two ribs of a fastening part. As a result, a simplified design is achieved.

In a further development of the invention, at least one sacrificial element is connected with at least one display means for optical display of the wear of the sacrificial element. As a result, maintenance of the apparatus with regard to a required replacement of the sacrificial element is simplified.

In an embodiment of the invention, the display means comprises at least one laterally projecting arm that engages into a guide into which it is possible to look from the outside. As a result, a change in position of the sacrificial element can be recognized by way of the change in position of the arm that engages into the guide.

In a further embodiment of the invention, at least one arm is formed by an engagement projection that is engaged in the guide in such a manner that it is held in the guide so that it can be displaced but cannot be released. As a result, the sacrificial element is prevented from unintentionally sliding out of the guide, by means of the bias determined by the spring element.

In a further development of the invention, the fastening parts are configured to be identical. As a result, the production costs are reduced, and inventory is minimized.

In an embodiment of the invention, the sacrificial element is produced from a baser material than the component to be accommodated, in particular from zinc and/or magnesium. As a result, a good anticorrosion effect is achieved.

Figure 2:
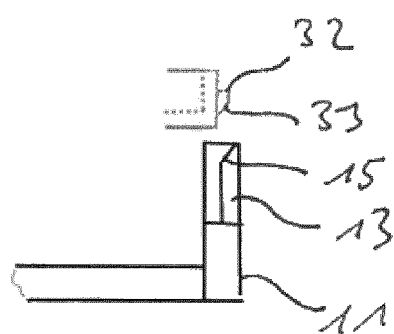

Other further developments and embodiments of the invention are indicated in the remaining dependent claims. An exemplary embodiment of the invention is shown in the drawings and will be described in detail below. The figures show:

FIG. 1 the schematic representation of a fastening part of an apparatus for fastening of a pipeline
 a) in a top view;
 b) in a side view;
 c) in a view from below;

FIG. 2 a detail representation of the wear indicator of the fastening part from FIG. 1;

FIG. 3 the schematic representation of a fastening part of an apparatus for fastening of a pipeline in a further embodiment
 a) in a top view;
 b) in a side view;
 c) in a view from below.

The apparatus for fastening of a pipe selected as the exemplary embodiment is configured as a block-shaped pipe clamp, which is composed of two identically structured pipe clamp halves 1. In the exemplary embodiment, the pipe clamp halves 1 are produced from polypropylene (PP) and have a basic body essentially configured in the shape of a hollow block, in the transverse side walls 11 of which a semicircular cutout 12 is formed, in each instance. Ribs 2 spaced at a parallel distance from one another are disposed between the transverse side walls 11. Breaking through the ribs 2, a block-shaped recess 21 for accommodating a sacrificial element 3 is introduced into the pipe clamp half 1. The recess 21 is delimited by side crosspieces 22 that are formed on and disposed to run between the transverse side walls 11. In the region of the recess 21, two guide slots 13 that are disposed parallel to one another and run vertically are introduced into the transverse side walls 11, in each instance. Furthermore, two bores 5 are introduced into the pipe clamp halves 1 on both sides of the cutouts 12, lying opposite one another. The bores 5 serve for passing screws through to brace the two pipe clamp halves 1 against a pipe—not shown—that is to be placed between the cutouts 12.

A sacrificial element 3 is accommodated by the recess 21. The sacrificial element 3 is configured essentially in block shape, wherein the cover surface of the sacrificial element 3 that faces the pipe to be accommodated is provided with a contour 31 that corresponds to the pipe to be accommodated. Two engagement projections 32 that are disposed at a distance from one another are formed on the sacrificial element 3, in each instance, on its sides that face the transverse side walls 11. The engagement projections 32 are provided with a slant 33 on their underside that faces the bottom 14 of the pipe clamp half 1, which slant corresponds to a slant 15 that is formed in above the guide slots 13, in each instance. When the sacrificial element 3 is introduced into the recess 21, the elastic transverse side walls 11 are moved outward by means of the interaction of the slants 33, 15, until the engagement projections 32 engage into the guide slots 13, whereupon the transverse side walls 11 assume their original position once again. Afterward, the sacrificial element 3 can be displaced vertically in the guide slots 13, by way of the engagement projections 32, but is held in captive manner. A pressure spring 4 is disposed between the bottom 14 of the pipe clamp half 1 and the sacrificial element 3, by way of which spring the sacrificial element 3 is biased against the bottom 14. The engagement projections 32 of the sacrificial element 3 are thereby laid against the upper delimitations of the guide slots 13.

To fasten a pipe in place, it is laid into the cutouts 12 of the side walls 11 of a pipe clamp half 1, and thereby the sacrificial element 3 is moved in the direction of the bottom 14 counter to the bias force of the pressure spring 4. In this regard, the engagement projections 32 of the sacrificial element 3 slide within the guide slots 13, in the direction of the bottom 14. An identically configured further pipe clamp half 1 is now placed onto the first pipe clamp half 1 in such a manner that the cutout 12 of the side walls 11 lies on the pipe—not shown. The cutouts 12 of the side walls 11 of the two pipe clamp halves 1 thereby form the passage for the pipe. Subsequently, the pipe clamp halves 1 are braced against one another by way of a screw—not shown—that is passed through the bores 5, and thereby the pipe—not shown—is clamped in between the side walls 11 provided with cutouts 12. Independent of the clamping forces transferred by way of the side walls 11, the sacrificial elements 3 are pressed against the accommodated pipe by way of the reset forces of the pressure springs 4, thereby achieving corrosion protection. With increasing consumption of the sacrificial elements 3 over time, these elements are repositioned by way of the pressure springs 4, and thereby the engagement projections 32 disposed in the guide slots 13 are moved toward the pipe. In this way, the consumption state of the sacrificial elements 3 can be read by way of the position of the engagement projections 32 in the guide slots 13, which position can be seen from the outside.

In the exemplary embodiment according to FIG. 2, the side crosspieces 22 are configured as holding ribs, which project into the semicircular cutout 12 of the transverse side walls 11 of the pipe clamp half 1. In this regard, the passage of the fastening apparatus formed by the two pipe clamp halves 1 is delimited by the projecting side crosspieces 22, by means of which the clamping forces are transferred to the pipe to be accommodated—not shown—after the two pipe clamp halves 1 have been braced against one another. Alternatively, the side crosspieces 22 can also end precisely flush with the cutouts 12 of the transverse side walls 11 of the two pipe clamp halves 1, and thereby the clamping forces are transferred to a pipe to be accommodated, not only by way of the contours of the side walls 11 formed by the cutouts 12 but also by way of the side crosspieces 22.

The invention claimed is:

1. An apparatus for fastening a component, the apparatus comprising a first fastening part, a second fastening part, at least one sacrificial element, and a spring element,
   wherein the first fastening part and the second fastening part can be connected with one another,
   wherein the first fastening part has a first recess, the second fastening part has a second recess, and the first recess and the second recess together form a passage in an assembled state of the first fastening part and the second fastening part,
   wherein an inside contour of the passage is configured for accommodating a pipe or hose,
   wherein the at least one sacrificial element is for minimizing corrosion and is provided in the first recess of the first fastening part,
   wherein the first recess ends laterally in the passage,
   wherein the at least one sacrificial element is disposed in movable manner in the first recess, and
   wherein the at least one sacrificial element is biased in a direction of the passage by way of the spring element.

2. The apparatus according to claim 1, wherein the spring element comprises a rubber element or elastomer element.

3. The apparatus according to claim 1, wherein the spring element comprises a helical spring or flexible spring.

4. The apparatus according to claim 1, wherein the passage is formed by contours of two or more pairs of ribs of the first and the second fastening parts, which serve to accommodate the component.

5. The apparatus according to claim 1, wherein the first fastening part comprises a first rib and a second rib, and
   wherein the first recess is formed between the first and the second ribs of the first fastening part.

6. The apparatus according to claim 1, wherein the at least one sacrificial element is connected with at least one display for optical display of the wear of the sacrificial element.

7. The apparatus according to claim 6, wherein the display comprises at least one laterally projecting arm that engages into a guide of the first fastening part into which it is possible to see from the outside.

8. The apparatus according to claim 7, wherein at least one arm is formed by an engagement projection, which is engaged into the guide in such a manner that it is held in the guide in displaceable but non-releasable manner.

9. The apparatus according to claim 1, wherein the first and the second fastening parts are configured in identical manner.

10. The apparatus according to claim 1, wherein the sacrificial element is produced from a baser metal than the component to be accommodated.

11. The apparatus according to claim 1, wherein the sacrificial element is produced from at least one member selected from a group consisting of zinc and magnesium.

\* \* \* \* \*